(12) United States Patent
Shearer

(10) Patent No.: US 9,067,388 B2
(45) Date of Patent: Jun. 30, 2015

(54) PAPERBOARD ASSEMBLY WITH CO EXTRUDED MICROLAYERED POLYMER BARRIER FILM

(75) Inventor: Dwayne M. Shearer, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 0 days.

(21) Appl. No.: 13/440,632

(22) Filed: Apr. 5, 2012

(65) Prior Publication Data
US 2013/0266749 A1 Oct. 10, 2013

(51) Int. Cl.
| B32B 27/10 | (2006.01) |
| B32B 27/08 | (2006.01) |
| B32B 27/32 | (2006.01) |
| B32B 27/34 | (2006.01) |
| B32B 27/36 | (2006.01) |
| B32B 29/00 | (2006.01) |

(52) U.S. Cl.
CPC ........... *B32B 27/10* (2013.01); *Y10T 428/1303* (2015.01); *Y10T 428/264* (2015.01); *Y10T 428/3175* (2015.04); *Y10T 428/31913* (2015.04); *Y10T 428/31797* (2015.04); *Y10T 428/31743* (2015.04); *B32B 27/08* (2013.01); *B32B 27/32* (2013.01); *B32B 27/34* (2013.01); *B32B 27/36* (2013.01); *B32B 29/00* (2013.01); *B32B 2307/7244* (2013.01); *B32B 2307/7246* (2013.01); *B32B 2439/40* (2013.01)

(58) Field of Classification Search
CPC ............... B29C 47/0021; B32B 27/10; B29K 2023/0625; B29K 2023/0633; B29K 2023/086; B29K 2077/00

USPC .................................. 428/34.2, 313, 215, 216
See application file for complete search history.

(56) References Cited

U.S. PATENT DOCUMENTS

| 7,276,294 B2 | 10/2007 | Cable |
| 8,088,478 B2 | 1/2012 | Fish |
| 2002/0192405 A1 | 12/2002 | Schwartz et al. |
| 2007/0269622 A1 | 11/2007 | Chuprevich |
| 2008/0038547 A1 | 2/2008 | Kenback Ash |
| 2008/0226852 A1 | 9/2008 | Shearer |
| 2011/0076507 A1 | 3/2011 | Shearer |
| 2011/0278311 A1 * | 11/2011 | Chiquet et al. ................. 220/660 |

FOREIGN PATENT DOCUMENTS

| EP | 1724108 A1 | 11/2006 |
| FR | WO0076765 | * 12/2000 |
| WO | 0140055 A2 | 6/2001 |
| WO | 2004101278 A1 | 11/2004 |
| WO | 2008012396 A1 | 1/2008 |

OTHER PUBLICATIONS

Wang, H., et al., "Confined Crystallization of Polyethylene Oxide in Nanolayer Assemblies," Science 323:757-760, Feb. 2009.

* cited by examiner

*Primary Examiner* — Ellen S Wood
(74) *Attorney, Agent, or Firm* — Timothy M. Whalen; Weyerhaeuser Law Dept.

(57) ABSTRACT

A co-extruded microlayered polymer barrier film is provided. The barrier film can be applied to paperboard to form a container having reduced oxygen gas permeability. Co-extrusion of the barrier film allows for the simultaneous fabrication of tens or hundreds of alternating microlayers of two different polymers that combine to form a film having reduced oxygen gas permeability compared to macro layer thickness films of the same two polymers.

18 Claims, 3 Drawing Sheets

PAPERBOARD ASSEMBLY WITH CO EXTRUDED MICROLAYERED POLYMER BARRIER FILM

BACKGROUND

In paperboard containers, a flat paperboard blank is folded over on itself to form a container that is square or rectangular in cross-section. The side ends of the container are sealed together to form the final structure. The paperboard is coated on its exterior and interior surfaces with a heat-sealable material that will bond to form the container. Typically, this heat sealable material is a low density polyethylene (LDPE) or other material having a melting point low enough to seal without damaging the paperboard.

There can be additional layers of material on the product side of the paperboard, between the paperboard and the interior sealing layer. One of these layers is usually a gas barrier layer. The gas barrier layer is either laminated, extruded, or co-extruded onto the paperboard to provide a board with gas barrier properties. Extrusion or co-extrusion is a faster, lower cost process than lamination. The cost of a laminate film and associated handling is also avoided with co-extrusion.

The need for a gas barrier in paperboard packages is well known and there have been many solutions to reduce gas transfer through the paperboard assembly. The amount and rate of gas transfer will depend on the type of barrier layer or layers that is used.

Particularly, the need for an oxygen barrier is well known. Oxygen contacting the product reduces the shelf life of the product. The amount and rate of oxygen transfer will depend on the type of barrier layer or layers that is used. The oxygen barrier layer is laminated, extruded or co-extruded onto the paperboard to provide a paperboard assembly with oxygen barrier properties. Oxygen is the gas for which barriers are tested but the barriers are useful for other gases so the barriers are commonly termed "gas barriers."

There are other factors than oxygen permeability that enter into the choice of a barrier material. Cost is a factor, both in the type and cost of the barrier material being used and also in the amount required to obtain the necessary barrier properties. The number of layers or laminations of material are a factor in the cost.

The most effective, and most costly, oxygen barrier has been an aluminum foil barrier. Food, such as chips, has been placed in foil or plastic pouches. Aluminum foil has also been used in juice containers. Plastic materials, such as nylon, have also been used as barrier materials. Many other materials have been proposed and used in order to reduce the cost of the barrier material. Each of these materials has attributes and shortcomings. Usually, a number of layers of different materials are provided, with each layer having a special function. These functions might be the ease of attachment, a barrier for certain gases, a barrier for certain chemicals in the contained liquid, the ability to adhere two layers together, and the ability to seal the container. Each of these layers adds cost to the container, both in material cost and production cost.

An effective oxygen barrier will have an oxygen transfer rate (OTR) of 40 or less cubic centimeters of oxygen per square meter per day (cc/m.sup.2/day) at standard temperature and pressure (STP) and 50% relative humidity (% RH). Water soluble or water dispersible oxygen barrier materials such as polyvinyl alcohol require large quantities of material per square meter to be effective. This is usually more material than can be applied in a coating application such as a size press without manufacturing difficulty.

A paperboard packaging material minimizing oxygen permeability is desired.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a paperboard assembly with oxygen barrier properties is provided. In one embodiment, the paperboard assembly includes:

a paperboard having a first side and a second side opposite the first side; and a composite barrier film adjacent the second side of the paperboard, the composite barrier film comprising:

a first containment layer, disposed closest to the paperboard;

a second containment layer, disposed farthest from the paperboard; and a microlayered composite layer intermediate the first containment layer and the second containment layer and comprising a plurality of unit layers, each unit layer comprising one layer of a first microlayer polymer and one layer of a second microlayer polymer, without a tie layer intermediate, wherein the first microlayer polymer is a polyolefin or a polyolefin modified for improved adhesion, and wherein the second microlayer polymer is selected from the group consisting of a polyamide (PA), polypropylene (PP), polyethylene terephthalate (PET), and blends thereof.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In one aspect, a paperboard assembly with oxygen barrier properties is provided. In one embodiment, the paperboard assembly includes:

a paperboard having a first side and a second side opposite the first side; and a composite barrier film adjacent the second side of the paperboard, the composite barrier film comprising:

a first containment layer, disposed closest to the paperboard;

a second containment layer, disposed farthest from the paperboard; and a microlayered composite layer intermediate the first containment layer and the second containment layer and comprising a plurality of unit layers, each unit layer comprising one layer of a first microlayer polymer and one layer of a second microlayer polymer, without a tie layer intermediate, wherein the first microlayer polymer is a polyolefin or a polyolefin modified for improved adhesion, and wherein the second microlayer polymer is selected from the group consisting of a polyamide (PA), polypropylene (PP), polyethylene terephthalate(PET), and blends thereof.

Figure 1:
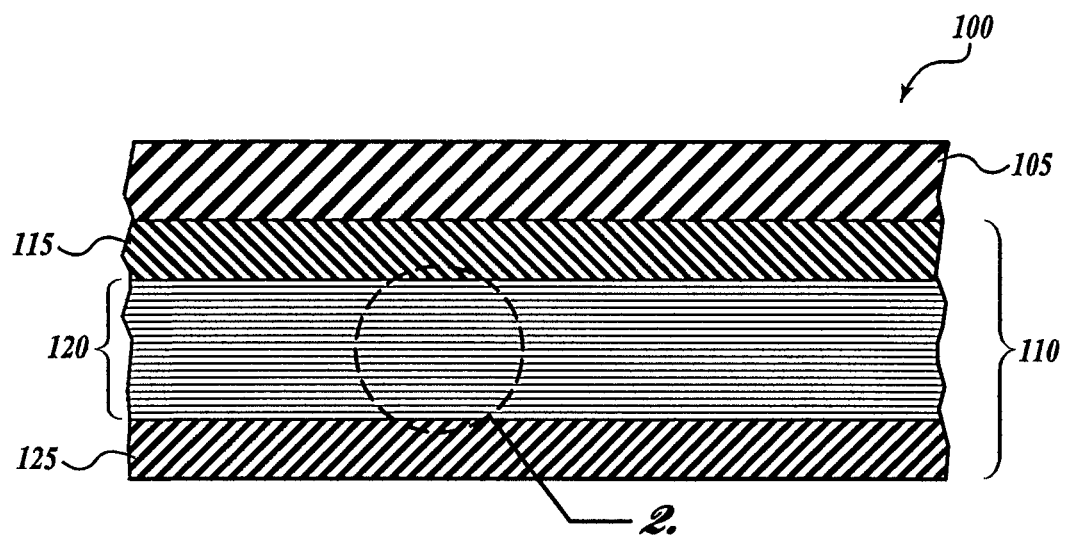
FIG. 1 is a cross-sectional diagram of a paperboard assembly with gas barrier properties in accordance with the disclosed embodiments.

FIG. 1 is a cross-sectional diagram of the paperboard assembly 100 with oxygen barrier properties. As used herein, "oxygen" typically refers to molecular oxygen gas ($O_2$)—which is the most critical gas that must be prevented from diffusing through a paperboard container—although it will be appreciated that other forms of oxygen, such as ozone are also encompassed.

In certain embodiments, the paperboard assembly 100 may also have water vapor barrier properties.

Referring to FIG. 1, the paperboard assembly 100 includes a paperboard 105 having a first side and a second side opposite the first side. A barrier film 110 is adjacent the second side of the paperboard 105. The barrier film 110 is comprised of at least three different regions: a first containment layer 115, disposed closest to the paperboard 105; a second containment layer 125, disposed farthest from the paperboard 105; and a microlayered composite layer 120 intermediate the first containment layer 115 and the second containment layer 125.

Figure 2:
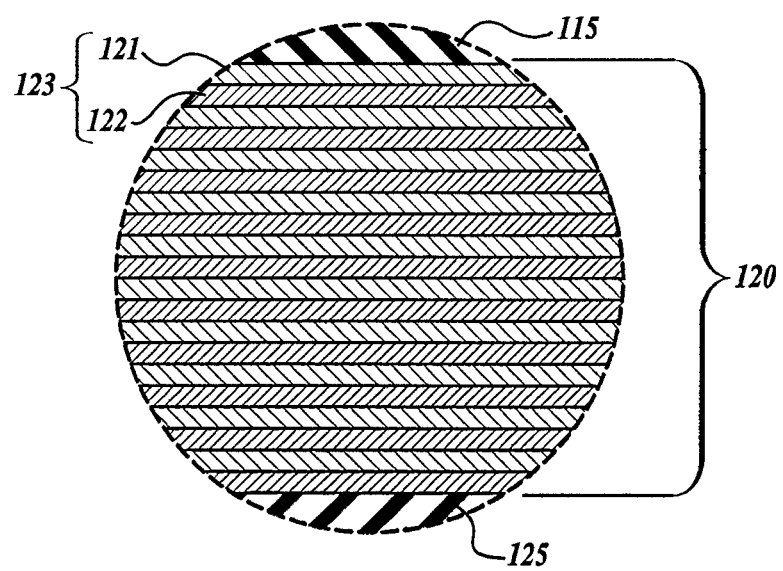
FIG. 2 is an enlarged view of a portion of the paperboard assembly of FIG. 1.

An enlarged view of the circular region 2 of FIG. 1 is shown in FIG. 2. Referring to FIG. 2, the microlayered film 120 is intermediate the first containment layer 115 and the second containment layer 125. In the microlayered film 120, a plurality of unit layers 123 are comprised of a first microlayer polymer 121 and a second microlayer polymer 122. The unit layer 123 repeats throughout the thickness of the microlayered film 120.

Each of the components of the paperboard assembly 100 of FIGS. 1 and 2 will now be discussed in further detail.

The paperboard assembly 100 provided herein has specific applications in food and beverage packaging or any applications where it is desirable to exclude oxygen from the interior of a container. The paperboard assembly 100 may be formed into food packages or into containers and cups or any other use known to those of skill in the art.

The foundation of the paperboard assembly 100 is the paperboard 105 itself. The paperboard 105 can be any type of paperboard known to those of skill in the art. By applying the barrier film 110 to the paperboard 105, the oxygen permeability of the paperboard assembly 100 is reduced compared to the oxygen permeability of the paperboard 105 itself. For example, in one embodiment the oxygen transmission rate OTR through the paperboard assembly is 30 g/m²·day or less at 23° C. and 50% relative humidity (RH). In another embodiment, the OTR is 40 g/m²·day or less at 23° C. and 50% RH.

In the embodiment illustrated in FIG. 1, the barrier film 110 is abutting the paperboard 105 to form the paperboard assembly 100. The barrier film 110 is comprised of a first containment layer 115, a second containment layer 125, and a microlayered composite layer 120 intermediate the containment layers. The barrier film is formed from two or more polymers that are co-extruded to form a barrier film 110 that is then applied to the paperboard 105 to form the paperboard assembly 100.

The barrier film 110 is of unitary construction, meaning that when the barrier film 110 is formed it is a single piece of polymer composite. This can be distinguished from attempting to recreate the barrier film 110 by sequentially depositing the dozens of polymer layers that comprise the barrier film 110 (i.e., depositing a first containment layer 115, depositing the many layers of the microlayered film 120, and then depositing the second containment layer 125). The barrier film 110 can be unitarily fabricated using a co-extrusion die with a layer multiplier, such as those sold by Extrusion Dies Industries, LLC. and Cloeren, Inc.

The first containment layer 115 is comprised of a polymer that is capable of binding ("tying") the paperboard 105 to the first microlayer polymer 121 of the microlayered film 120. Therefore, the composition of the first containment layer 115 must be selected to provide a bond between the paperboard 105 and the first microlayer polymer 121, and so the composition of the first containment layer 115 may vary depending on the characteristics of the paperboard 105 and the first microlayer polymer 121. In a representative example, the first containment layer 115 is a polyolefin, such as a polyethylene (e.g., polypropylene (PP), high-density polyethylene (HDPE), low-density polyethylene (LDPE), or linear LDPE), a polyamide (such as nylon), or a polyamide/PET blend. Additional representative first containment layer 115 polymers include "modified" versions of the above-listed polymers, which are modified to include additional moieties within the polymer, such as maleic anhydride (which improves adhesion properties).

The first containment layer 115 may be a water vapor barrier, depending on its composition. For example, if a blend of PET and amorphous nylon is used, the first containment layer 115 could be a water vapor barrier depending on the amount of PET.

The second containment layer 125 is disposed furthest from the paperboard 105 and provides structural containment of the microlayered film 120 in a similar manner to the first containment layer 115. The composition of the second containment layer 125 is such that it will bond, without a tie layer, to whichever of the first microlayer polymer 121 and second microlayer polymer 122 is disposed at the surface of the microlayered film 120 closest to the second containment layer 125.

The composition of the second containment layer 125 may be the same or different from the first containment layer 115. In the configuration of the paperboard assembly 100 illustrated in FIG. 1, the second containment layer 125 is the last layer of the barrier film 110 applied to the paperboard 105, such that the second containment layer 125 will be the material of the paperboard assembly 100 exposed to the product contained within a container formed from the paperboard assembly 100. With this in mind, a representative second containment layer is LDPE, which is known to those of skill in the art as a polymer layer acceptable for contacting typical products stored within paperboard containers. LDPE also provides water vapor barrier properties. However, it will be appreciated by those of skill in the art that other polymers for the second containment layer 125 can be used as long as the requirements of the paperboard assembly 100 and the product contained therein are met.

The first containment layer 115 and second containment layer 125 may have thicknesses that are the same or different. Each layer must be at least thick enough to support the microlayered film 120, which typically requires a minimum thickness for the containment layers 115 and 125 of 1 micron or greater. However, it will be appreciated that the properties of the polymers forming the containment layers 115 and 125 will dictate the minimum thickness required for the layers.

The microlayered film 120 has oxygen barrier properties and may also have water vapor barrier properties, depending on its composition. The microlayered film 120 includes a plurality of unit layers 123, each comprised of a first microlayer polymer 121 and a second microlayer polymer 122, without a tie layer in between. That is, the first microlayer polymer 121 and the second microlayer polymer 122 abut each other in the unit layer 123. Similarly, there are no tie layers in between abutting unit layers 123 in the microlayered film 120.

The number of unit layers 123 can be adjusted according to the mechanical and oxygen transport characteristics desired from the paperboard assembly 100. In certain embodiments, the microlayered film 120 comprises between 10 and 100 unit layers 123. The microlayered film 120 can be configured such that either the first microlayer polymer 121 or the second microlayer polymer 122 can contact either or both of the first containment layer 115 and second containment layer 125. It will be appreciated that in the configuration illustrated in FIG. 2, the first microlayer polymer 121 contacts the first containment layer 115, and the second microlayer polymer 122 contacts the second containment layer 125. While this is a particular embodiment, the aspects provided herein are not limited to such an embodiment.

The thicknesses of the first microlayer polymer 121 and the second microlayer polymer 122 can be varied according to the co-extrusion process. In certain embodiments, the first microlayer polymer 121 and the second microlayer polymer 122 each have a thickness of from 0.1 to 0.8 microns.

In certain embodiments, thickness of the barrier film 110 is from 0.4 mil to 2.0 mil.

The first microlayer polymer 121 is a polyolefin. Polyolefins are known to those of skill in the art to include the various forms of LDPE and HDPE. In one embodiment, the polyolefin is selected from the group consisting of a polyethylene, low-density polyethylene, linear low-density polyethylene, high-density polyethylene, and combinations thereof. The polyolefin 121 may be modified to improve adhesion to polymer 122. The addition of maleic anhydride to the polyolefin is one way of providing improved adhesion.

The composition of the second microlayer polymer 122 is selected from the group consisting of polyamide (such as a nylon), polypropylene, polyethylene terephthalate (PET), and blends thereof. As disclosed in the experimental evidence set forth below in Table 1, microlayers incorporating polyamide or PET as the second microlayer polymer 122 both dramatically reduce the oxygen transmission across a representative barrier film 110.

In one embodiment, the polyamide is selected from the group consisting of a nylon, PA6, PA66, amorphous nylons such as DuPont Selar 3426 or EMS Grivory G21, aromatic ring containing nylons such as MXD6 or MXD6/MXDI, and combinations thereof.

With regard to the composition and thickness of the microlayer polymers 121 and 122, as well as the thickness of the microlayered film 120, it will be appreciated that the design trade offs involved include variations of mechanical flexibility, conservation of materials, and resistance to oxygen transmission. In this regard, the greater the number of unit layers 123, the greater the reduction in oxygen permeability for the barrier film 110. However, increasing the number of unit layers 123 also requires more polymer material to be used (increasing cost). Therefore, by balancing these characteristics, one of skill in the art can form an appropriate barrier film 110 according to the design requirements of a particular packaging requirement.

Figure 3:
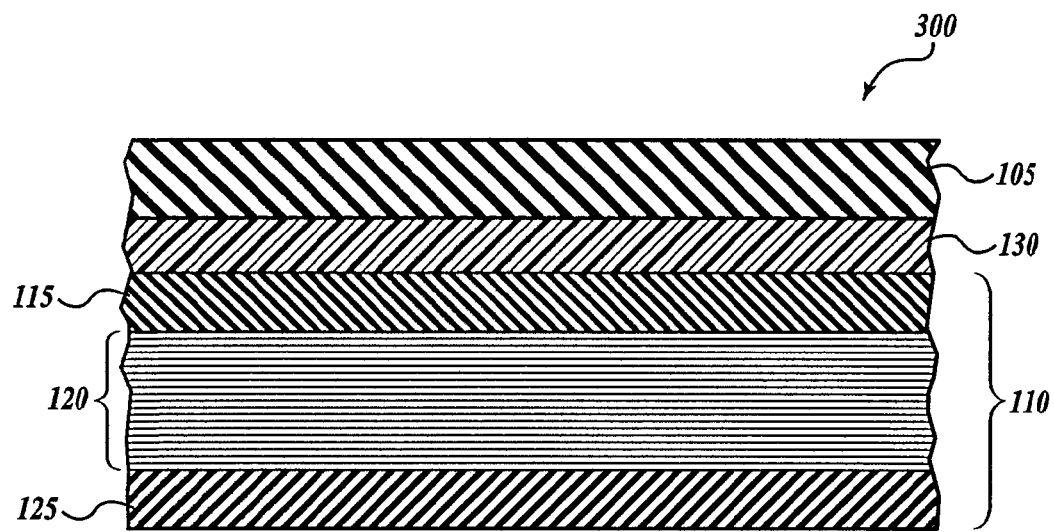
FIG. 3 is a cross-sectional diagram of a paperboard assembly with gas barrier properties in accordance with the disclosed embodiments.

Referring now to FIG. 3, another embodiment of a paperboard assembly 300 is illustrated, wherein an additional tie layer 130 is inserted intermediate the paperboard 105 and the barrier film 110 when compared to the paperboard assembly 100 illustrated in FIGS. 1 and 2. The tie layer 130 may serve several purposes, and may also be comprised of one or more layers of one or more different polymers. While the purpose of the tie layer 130 may be to physically tie the barrier film 110 to the paperboard 105, the tie layer 130 may also, or instead, serve the purpose of providing further water vapor barrier properties and/or durability. For example, a water vapor barrier polymer may be used for the tie layer 130, which would provide an additional layer of protection for the paperboard assembly 300 compared to the paperboard assembly 100, which does not include the tie layer 130. In the representative case where the tie layer 130 is a water vapor barrier polymer, both HDPE and LDPE are representative materials that could be used for such an application. In the representative case where the tie layer 130 provides improved durability, both PP and linear-LDPE are representative polymers that can be used for the tie layer 130.

Figure 4:
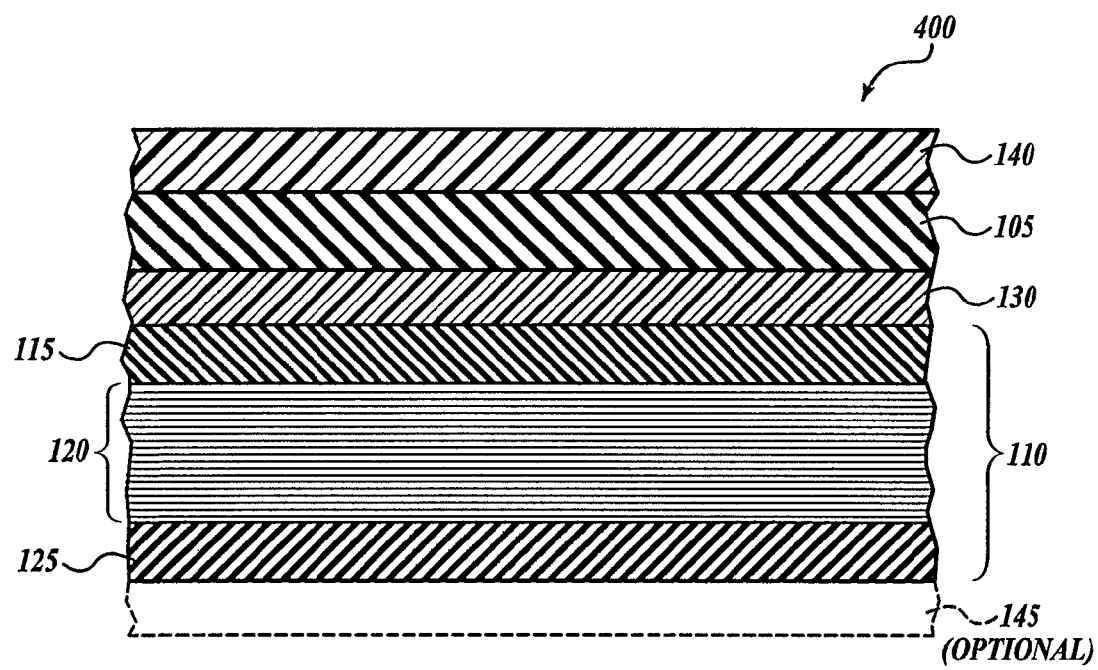
FIG. 4 is a cross-sectional diagram of a paperboard assembly with gas barrier properties in accordance with the disclosed embodiments.

Referring now to FIG. 4, another embodiment of a paperboard assembly 400 is illustrated. The paperboard assembly 400 is similar to the paperboard assembly 300 of FIG. 3, although it includes a printing layer 140 abutting the first side of the paperboard 105. The printing layer 140 is a layer known to those of skill in the art as being the "outside" face of a container made from paperboard, and therefore is configured to receive and support a printed image, such as packaging logos, colors, words, etc. The printing layer 140 also acts as a barrier against the migration of moisture (e.g., vapor or condensation) into the paperboard 105.

FIG. 4 also illustrates an optional product layer 145 that can be included in any embodiment disclosed herein (i.e., this layer is not limited to the configuration shown in FIG. 4 but is also applicable to the configurations illustrated in FIGS. 1-3). The product layer 145 has a composition compatible with the product which the paperboard assembly 400 will come into contact with when formed into a container. As discussed above, LDPE is a common polymer that is used in paperboard packaging, which is why it is an exemplary material useful as the second containment layer 125 in the embodiments disclosed herein. However, if the second containment layer 125 is a material that is not compatible with the product, a product layer 145 can be applied over the barrier film 110 so as to improve the compatibility of the paperboard assembly 400 with the product. While LDPE is a representative material useful as a product layer 145, although any material known to those of skill in the art will be useful in the described embodiments. Product layer 145 may also act as a barrier to reduce water vapor from migrating into the paperboard 105.

Experimental testing was performed on several exemplary paperboard assemblies of the type described in the embodiments herein. Table 1 summarizes these results. Both a polyamide (PA) and a PET control sample were used, which were compared to microlayered PA and microlayered PET. The samples included a barrier film 110 having a first containment layer 115 consisting of LDPE, a second containment layer 125 consisting of LDPE, and a polymer layer varied between PA, PET, microlayered LDPE/PA, and microlayered LDPE/PET. Two independent testing facilities were used to test the barrier films for both oxygen transmission rate (OTR) and water vapor transmission rate (WVTR). As can be seen from the data in Table 1, oxygen transmission is dramatically reduced in both the microlayer PA films and the microlayer PET films compared to the respective control films. Accordingly, the barrier films disclosed herein are particularly useful as oxygen barriers. Some combinations of microlayered films may also reduce water vapor transmission.

TABLE 1

Water vapor and oxygen permeability test results.

| Sample | Sample Description (0.5 mil LDPE containment layer/ Polymer layer listed below/ 0.5 mil LDPE containment layer) | Testing Facility A | | Testing Facility B | |
|---|---|---|---|---|---|
| | | WVTR gm-mil/ (100 in² · day) | OTR cc-mil/ (100 in² · day) | WVTR gm-mil/ (100 in² · day) | OTR cc-mil/ (100 in² · day) |
| Control PA | 0.28 mil PA | 1.13 | 22.7 | 0.34 | 20.4 |
| Control PET | 0.33 mil PET | 1.00 | 138.5 | 0.32 | 49.6 |
| Microlayer PA | 0.28 mil of 48 microlayers of LDPE/PA | 1.23 | 12.9 | 0.34 | 14.7 |
| Microlayer PET | 0.33 mil of 48 microlayers of LDPE/PET | 0.80 | 70.9 | 0.36 | 35.9 |

Figure 5:
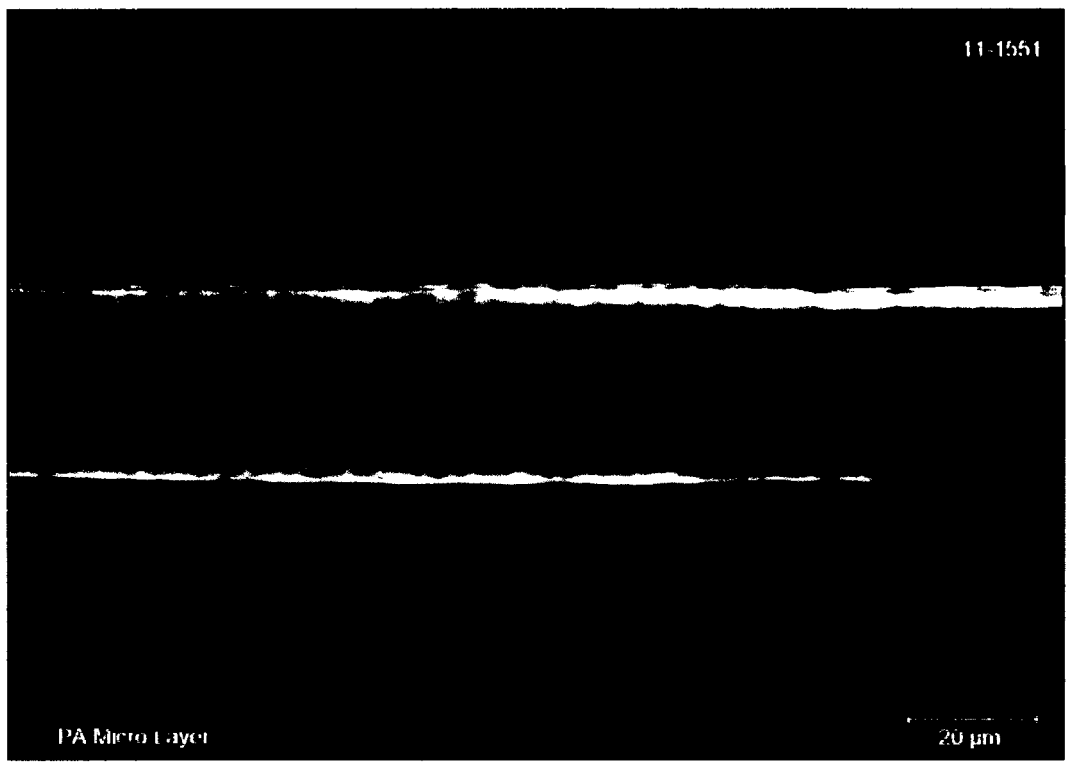
FIG. 5 is a micrograph of a cross-section of an exemplary composite barrier film in accordance with the disclosed embodiments.

FIG. 5 is a micrograph of a Microlayer PA film similar to those that were tested to provide the results in Table 1.

Methods for forming the paperboard assemblies disclosed herein are also provided. In one aspect, a method for forming a paperboard assembly 100 is provided that includes the steps of providing a paperboard 105; co-extruding a barrier film 110 including a first containment layer 115, a second containment layer 125, and a microlayered composite layer 120 intermediate; and applying the barrier film 110 to the paperboard 105 to form the paperboard assembly 100. In order to facilitate bonding of the barrier film 110 to the paperboard 105, the paperboard 105 is typically pretreated to generate favorable surface chemistry for bonding. For example, either flame or corona pretreatment of the paperboard 105 are representative pretreatment methods.

Methods for making the paperboard assembly 100 may also include steps of providing a tie layer 130 intermediate the barrier film 110 and the paperboard 105. A product layer 145 can be applied to the barrier film 110. A printing layer 140 can be applied to the paperboard 105. The tie layer 130 and product layer 145 can be co-extruded with the barrier film 110 or laminated onto the paperboard 105 or barrier film 110 independent of the co-extrusion of the barrier film 110.

The disclosed embodiments are useful for forming gable-top containers, and therefore, in certain embodiments, a gable-top container is provided that includes a paperboard assembly as disclosed herein. Other types of containers include rectangular containers and any other container shapes known to those of skill in the art that can be manufactured using paperboard. Methods for forming containers using the paperboard assembly are also provided. When forming a container from one of the disclosed paperboard assemblies, it is typical for the second containment layer 125 (or the product layer 145) to form a seal with itself or the printing layer 140, depending on the type of container (e.g., rectangular or gable-top).

While illustrative embodiments have been illustrated and described, it will be appreciated that various changes can be made therein without departing from the spirit and scope of the invention.

The embodiments of the invention in which an exclusive property or privilege is claimed are defined as follows:

1. A paperboard assembly with oxygen barrier properties, comprising:
   a paperboard having a first side and a second side opposite the first side; and
   a composite barrier film adjacent the second side of the paperboard, the composite barrier film comprising:
   a first containment layer, disposed closest to the paperboard;
   a second containment layer, disposed farthest from the paperboard; and
   a microlayered composite layer intermediate the first containment layer and the second containment layer and comprising a plurality of unit layers, each unit layer comprising a layer of a first microlayer polymer and a layer of a second microlayer polymer, without a layer intermediate, wherein the first microlayer polymer is a polyolefin, and wherein the second microlayer polymer is selected from the group consisting of a polyamide, polypropylene, polyethylene terephthalate, and blends thereof.

2. The paperboard assembly of claim 1, wherein the composite barrier film is from 0.4 mil to 2.0 mil thick.

3. The paperboard assembly of claim 1, wherein the plurality of unit layers comprises from 10 to 100 unit layers.

4. The paperboard assembly of claim 1, wherein the first containment layer of the composite barrier film abuts the paperboard.

5. The paperboard assembly of claim 1, further comprising a tie layer intermediate the composite barrier film and the paperboard.

6. The paperboard assembly of claim 5, wherein the tie layer is a polymer that inhibits water vapor diffusion.

7. The paperboard assembly of claim 6, wherein the tie layer comprises a polyethylene selected from the group consisting of high-density polyethylene, low-density polyethylene, linear low-density polyethylene and modified versions thereof.

8. The paperboard assembly of claim 1, wherein the composite barrier film is positioned relative to the paperboard such that the first microlayer polymer faces the paperboard.

9. The paperboard assembly of claim 1, wherein the composite barrier film is positioned relative to the paperboard such that the second microlayer polymer faces the paperboard.

10. The paperboard assembly of claim 1, wherein the composite barrier layer is co-extruded from the first microlayer polymer and the second microlayer polymer.

11. The paperboard assembly of claim 1, wherein the polyolefin is selected from the group consisting of a low-density polyethylene, linear low-density polyethylene, high-density polyethylene, and combinations thereof.

12. The paperboard assembly of claim 1, wherein the polyamide is selected from the group consisting of a nylon, PA6, PA66, amorphous nylons such as DuPont Selar 3426 or EMS Grivory G21, aromatic ring containing nylons such as MXD6 or MXD6/MXDI, and combinations thereof.

13. The paperboard assembly of claim 1, wherein each unit layer consists of a layer of the first microlayer polymer and a layer of a second microlayer polymer.

14. The paperboard assembly of claim 1, wherein the paperboard assembly is configured as a gable-top container.

15. The paperboard assembly of claim 1, wherein the microlayered film reduces oxygen diffusion.

16. The paperboard assembly of claim 1, wherein the oxygen transmission rate through the paperboard assembly is 40 $g/m^2 \cdot day$ at 23° C. and 50% relative humidity or less.

17. The paperboard assembly of claim 1, wherein the microlayered film reduces water vapor diffusion.

18. The paperboard assembly of claim 1, wherein the paperboard assembly reduces water vapor diffusion.

* * * * *